United States Patent [19]

Sandbank

[11] Patent Number: 4,885,579
[45] Date of Patent: Dec. 5, 1989

[54] DEVICE FOR THE REMOTE CONTROL OF A VIDEORECORDER OR A VIDEORECEIVER

[75] Inventor: Charles P. Sandbank, Reigate, United Kingdom

[73] Assignee: British Broadcasting Corporation, London, England

[21] Appl. No.: 134,775

[22] PCT Filed: Apr. 16, 1987

[86] PCT No.: PCT/GB87/00259
 § 371 Date: Apr. 25, 1988
 § 102(e) Date: Apr. 25, 1988

[87] PCT Pub. No.: WO87/06416
 PCT Pub. Date: Oct. 22, 1987

[30] Foreign Application Priority Data
 Apr. 18, 1986 [GB] United Kingdom ............... 8609524

[51] Int. Cl.$^4$ ................... H04N 5/782; H04N 7/087
[52] U.S. Cl. ........................ 340/825.72; 340/825.69; 358/194.1; 358/86
[58] Field of Search ............ 340/825.72, 825.69, 340/825.22; 379/102; 358/194.1, 86, 336

[56] References Cited

U.S. PATENT DOCUMENTS

| | | | |
|---|---|---|---|
| 4,706,121 | 11/1987 | Young | 340/825.22 |
| 4,728,949 | 3/1988 | Platte et al. | 340/825.69 |
| 4,743,968 | 5/1988 | Mogi | 358/194.1 |
| 4,758,501 | 5/1988 | Long | 358/194.1 |

FOREIGN PATENT DOCUMENTS

| | | |
|---|---|---|
| 0122626 | 4/1984 | European Pat. Off. . |
| 0133985 | 7/1984 | European Pat. Off. . |
| 3335082A1 | 9/1983 | Fed. Rep. of Germany . |
| 2104277A | 11/1981 | United Kingdom . |
| 2126002A | 9/1982 | United Kingdom . |

OTHER PUBLICATIONS

Hofmann, Von Gunter et al., "Videotext Programmiert Videorecorder", *Journal Rundfunktech Mitteilungen,* Jan. 26, 1982, 254–257.

Kruger, H. Eckhard, "Das Digitale Fernshkennungssystem ZPS", *Nachrichtentechnische Zeitschrift N.T.Z.,* vol. 35 (Jun. 1982), No. 6.

Primary Examiner—Donald J. Yusko
Assistant Examiner—Brian Palladino
Attorney, Agent, or Firm—Robert F. O'Connell

[57] ABSTRACT

A conventional video recorder comprises electromechanical components, electronic circuits and a control unit with which there are associated both front panel controls and a user remote control unit with a sensor to which signals can be sent from a hand-held remote control unit. In addition to these conventional features an off-air remote controller is provided. This is capable of decoding control signals associated with the television signal and includes an encoder which generates outputs which simulate those from the conventional user remote control unit.

10 Claims, 2 Drawing Sheets

DEVICE FOR THE REMOTE CONTROL OF A VIDEORECORDER OR A VIDEORECEIVER

BACKGROUND OF THE INVENTION

The present invention relates to television receivers and video recorders, commonly known as video tape recorders (VTR) or video cassette recorders (VCR). The essential components of a video recorder are the electromechanical components including the tape drive mechanism, control relays and electromagnets, magnetic heads and head scanning mechanism. Secondly there are the electronic circuits for processing the video signals being recorded or played back. Thirdly there is the control unit which controls the electromechanical components and the electronic circuit. The control unit may be very simple or provided with many facilities for scheduled recording, various modes of replay and so on. In any event, some means of providing control inputs have to be provided and, at the simplest, these may consist solely of front panel controls. However, it is well known to provide domestic video recorders with remote control units which either plug into the recoder or transmit infrared or ultrasonic control signals to a sensor on the recorder.

Television receivers ae also well known with remote control units as well as front panel controls.

In the professional field it is known to control recorders by transmitting control signals along with the wanted information signal. The recorder responds appropriately to the received control signals. See for example GB 2126002.

SUMMARY OF THE INVENTION

The object of the present invention is to make it possible to add such facilities to domestic receivers and video recorders, in particular as an add on facility for existing receivers and recorders.

Video recorders are known from EP 0 133985 and EP 0 122626 which have two remote control units. The first unit comprises a bar code reader responsive to television program schedule data input by the user to enter such data in a program memory. The second unit receives control signals accompanying the broadcast signal and compares these with the data in the program memory to determine the times at which the video recorder is switched on and off. The first unit simply automates the programming of the video recorder.

The present invention provides a video recorder including electromechanical components, an electronic circuit and a control unit therefor, a remote control unit responsive to user input signals to provide control signals to the control unit and a second remote control unit responsive to received control signals accompanying a received television signal, to decode the received control signals and provide to the control unit control signals which match those provided by the first mentioned remote control unit.

The present invention also provides a television receiving apparatus including an electronic circuit and a control unit therefor, a remote control unit responsive to user input signals to provide control signals to the control unit and a second remote control unit responsive to received control signals accompanying a received television signal, to decode the received control signals and provide to the control unit control signals which match those provided by the first mentioned remote control unit.

In the present invention, the two remote control units can act independently as parallel, alternative means of control. Therefore the second unit can be provided as an add-on facility to an existing video recorder or receiver.

BRIEF DESCRIPTION OF THE DRAWINGS

An embodiment of the invention will now be described, by way of example, with reference to the accompanying drawings, in which.

DESCRIPTION OF THE PREFERRED EMBODIMENTS

Figure 1:
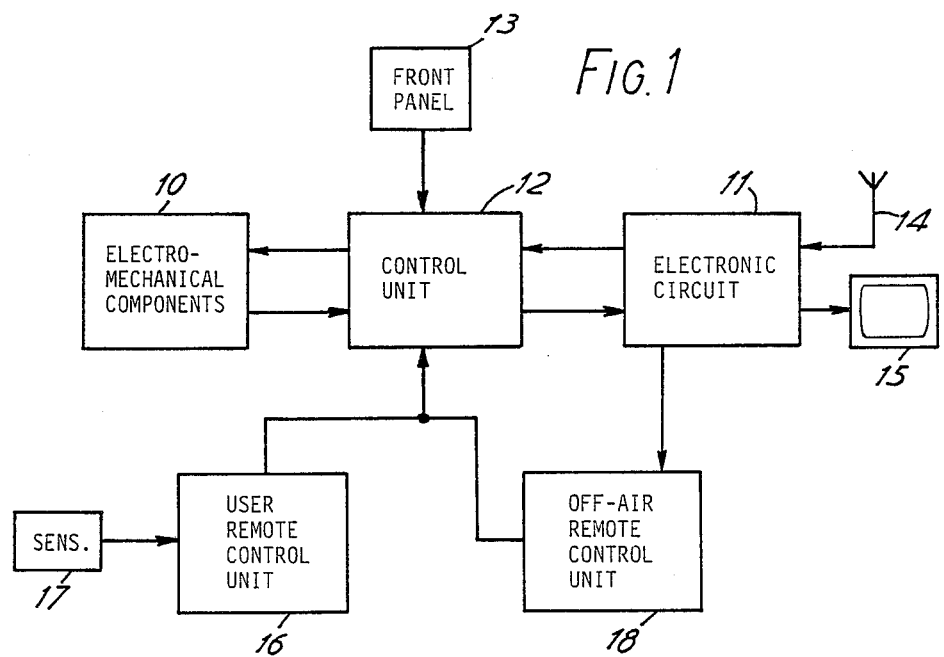
FIG. 1 shows the main components of a video recorder.

The video recorder 20 shown in FIG. 1 comprises the electromechanical components 10, the electronic circuits 11 and a main control unit 12. The input to and output from the electronic circuits are symbolised by an aerial 14 and a connection 19 to a television set 15. The control unit 12 is provided with conventional front panel controls 13.

The recorder is also provided with a conventional user remote control unit 16 a first remote control unit) which picks up signals directed on to an infrared sensor 17 by a hand held unit 24 (FIG. 2) with buttons for effecting channel selection, record, playback and so on. The video recorder 20 as so far described represents conventional practice. The recorder according to the present invention is provided with an off-air remote control unit 18 (a second remote control unit) which can provide exactly the same output signals to the main control unit 12 as are conventionally provided by the user remote control unit 16. The off-air remote control unit 18 derives its input via the electronic circuit 11 from the received television signal which is accompanied by data signals, for example signals conforming to the German VPS standards. Such VPS codes are sometimes transmitted in Germany with the broadcast signal to control the operation of recorders remotely. In FIG. 1 the off-air unit 18 is shown feeding directly into the main control unit 12. However, in the preferred practice of the invention, the off-air unit is not built into the video recorder itself but is constructed as a separate controller 30 (FIG. 2) which passes the control commands to the recorder using the input sensor 17 on the recorder 20 provided for the hand-held remote control unit 24. This has the advantage that no modification whatsoever to the recorder is required. If the recorder uses a hand-held unit connected by wire, the controller is plugged in in place of the hand-held unit. This has the disadvantage that the hand-held unit cannot be used when the controller is connected. This problem could be overcome by providing the controller with a plug incorporating a socket for the hand-held unit.

In the case of infra-red or ultrasonic remote control systems, the controller radiates control signals to the senser 17, just like the hand-held unit, which can still be used in the normal.

Figure 2:
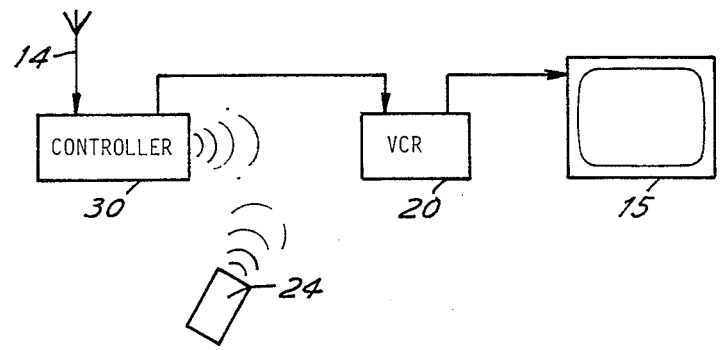
FIG. 2 is a diagram illustrating the physical set-up.

The arrangement of a receiving installation using such a broadcast controller is shown in FIG. 2. In this case, the aerial 14 and the television receiver 15 are connected to the recorder 20 in the conventional manner except that the aerial signal is 'looped through' the separate off-air controller 30 forming the second remote control unit. The television receiver 15, the recorder 20 and the hand-held remote control unit 24 can all be used in the normal way except when the off-air controller 30 responds to codes in the transmitted signal. The controller 30 could be made to respond to signals in the VPS format, but the transmission efficiency and convenience can be improved by using teletext data signals for the control codes.

Figure 3:
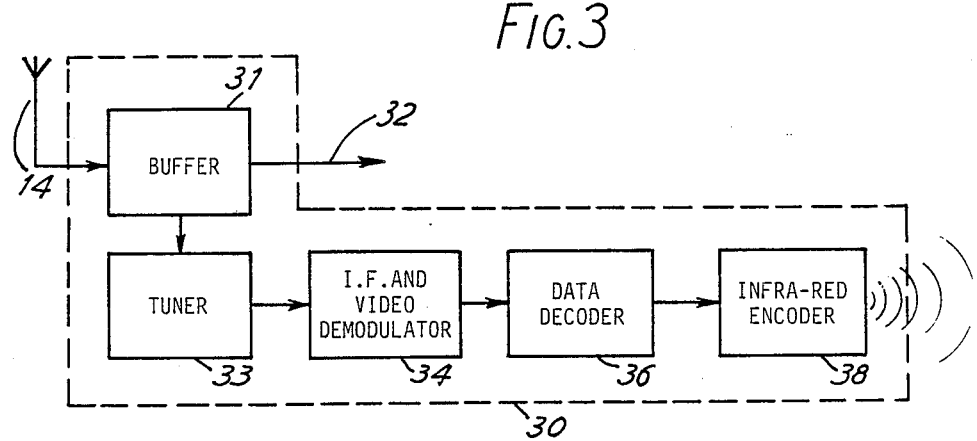
FIG. 3 is a block diagram of an off-air remote controller.

The main units of the off-air controller 30 are shown in FIG. 3. Signals from the aerial 14 are buffered 31 to provide a 'loop-through' output 32 to the recorder 20 and to feed tuner and demodulator stages 33, 34 similar to those of a conventional television receiver. Teletext data signals corresponding to the available remote control functions are then extracted from the vertical blanking intervals of the signal by the data decoder 36 and re-encoded to produce infra-red (or ultrasonic) signals with the same coding format as those produced by the hand-held controller 24.

Figure 4:
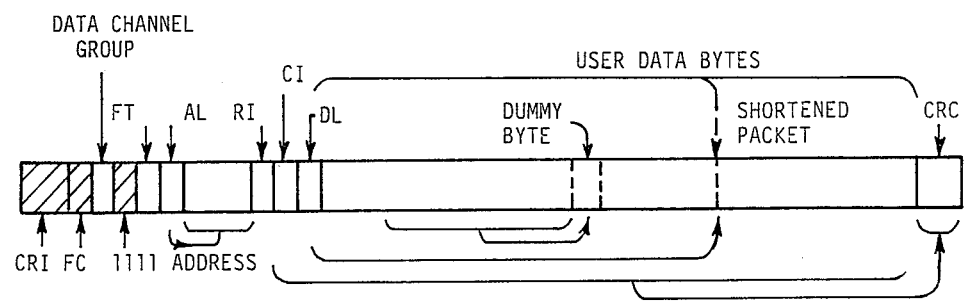
FIG. 4 shows a known control signal format.

The structure of a suitable teletext data signal (known as Datacast) is shown in FIG. 4. This consists of a two-level signal starting with Clock Run-In (CRI) and Framing Code (FC) data in the normal teletext format. Background detail for this system can be found in "BBC Datacast—The Transmission System" from the IERE Conference on Electronic Delivery of Data and Software, Sept. 1986: IERE Conference Publication No. 69, pp. 93–98.

The provision of a separate off-air remote control unit 18 makes it possible for the conventional, domestic video recorder to make use of the data signals because the unit 30 effectively decodes these signals and converts them to control signals simulating those from the user remote control unit 24. It accordingly becomes possible to switch the recorder on to record by remote control over the air, to select the channel being recorded, to terminate recording at the end of a program and so on.

The hand-held remote control unit 24 is usually dedicated to a particular application, that is to say it would emit only one set of control codes matching those for a corresponding video recorder (or television receiver). However the additional unit 30 could be capable of providing any one of a number of different sets of control signals and have a selector device for strapping the unit to provide the required set for a given application. Implementation could largely be in software terms with appropriate codes set up in ROM. Selection could be effected by plugging in different ROMs.

I claim:

1. A video recorder including electromechanical components, an electronic circuit and a main control unit therefor, a first remote control unit responsive to user input signals to provide control signals to the main control unit and a second remote control unit responsive to received control signals accompanying a received television signal, to decode the received control signals and provide to the main control unit control signals which simulate those provided by the first remote control unit, whereby said first and second remote control units can act independently as parallel, alternative means of control.

2. A video recorder according to claim 1, comprising an input device for receiving the control signals from the first remote control unit, and wherein the control signals provided by the second remote control unit are fed to the said input device.

3. A video recorder according to claim 2, wherein the second remote control unit comprises a decoder for decoding the received control signals and an encoder for re-encoding the decoded signals as the control signals which match these provided by the first remote control unit.

4. A video recorder according to claim 3, wherein the encoder is an infra-red or ultrasonic encoder for radiating control signals to a sensor forming the said input device of the video recorder.

5. A video recorder according to any of claims 1 to 4, wherein the second remote control unit is capable of providing any one of a number of different sets of control signals and comprises a selector device for selecting one such set.

6. A video recorder according to claim 5, wherein the selector device comprises an interchangeable read-only memory device.

7. A controller for use with a video recorder having an input device for receiving control signals from a hand-held remote control unit, comprising an aerial input, means for receiving and demodulating broadcast television signals, a decoder for decoding control signals in the demodulated signals, and an encoder for re-encoding the decoded signals in a form for controlling the video recorder by way of the said input device.

8. A controller according to claim 7, comprising a buffer amplifier and an output for looping out the signal on the aerial input to the video recorder.

9. A controller according to claim 7 or 8, wherein the encoder is an infra-red or ultrasonic encoder for radiating control signals to a sensor forming the said input device of the recorder.

10. A television receiving apparatus including an electronic circuit and a main control unit therefor, a first remote control unit responsive to user input signals to provide control signals to the main control unit and a second remote control unit responsive to received control signals accompanying a received television signal, to decode the received control signals and provide to the main control unit control signals which simulate those provided by the first mentioned remote control unit, whereby said first and second remote control units can act independently as parallel, alternative means of control.

* * * * *